United States Patent
Daulisa

(10) Patent No.: US 12,012,171 B1
(45) Date of Patent: Jun. 18, 2024

(54) REMOTE CONTROLLER APPARATUS

(71) Applicant: Spencer Daulisa, St. Robert, MO (US)

(72) Inventor: Spencer Daulisa, St. Robert, MO (US)

( * ) Notice: Subject to any disclaimer, the term of this patent is extended or adjusted under 35 U.S.C. 154(b) by 0 days.

(21) Appl. No.: 18/110,170

(22) Filed: Feb. 15, 2023

(51) Int. Cl.
| B62K 11/14 | (2006.01) |
| E05B 67/06 | (2006.01) |
| E05B 67/24 | (2006.01) |
| G07C 9/00 | (2020.01) |
| G08C 17/02 | (2006.01) |
| B62H 5/00 | (2006.01) |

(52) U.S. Cl.
CPC ............ *B62K 11/14* (2013.01); *E05B 67/063* (2013.01); *E05B 67/24* (2013.01); *G07C 9/00309* (2013.01); *G07C 9/00896* (2013.01); *G08C 17/02* (2013.01); *B62H 5/001* (2013.01); *G07C 2009/00793* (2013.01); *G07C 2009/00928* (2013.01)

(58) Field of Classification Search
CPC ....... B62H 5/001; E05B 67/063; E05B 71/00; B62K 11/14; G07C 2009/00928
See application file for complete search history.

(56) References Cited

U.S. PATENT DOCUMENTS

| 5,823,021 | A | * | 10/1998 | Chang | ................... E05B 67/063 70/38 A |
| D415,734 | S | | 10/1999 | Pomales | |
| 6,147,597 | A | | 11/2000 | Facory | |
| 6,937,149 | B2 | * | 8/2005 | McMahon | ............. B62K 11/14 340/539.11 |
| 6,942,131 | B2 | | 9/2005 | Trautman | |
| D549,620 | S | | 8/2007 | Wendele | |
| 9,779,618 | B2 | | 10/2017 | Ono | |
| 10,960,952 | B2 | | 3/2021 | Osanai | |
| 2002/0020249 | A1 | * | 2/2002 | Darland | ................. B62K 23/06 74/551.8 |
| 2013/0146726 | A1 | | 6/2013 | Bobrow | |
| 2014/0000322 | A1 | * | 1/2014 | Williams | ............... B62H 5/003 70/18 |
| 2016/0333607 | A1 | * | 11/2016 | Cagan | ................. E05B 73/0011 |
| 2017/0274958 | A1 | * | 9/2017 | Felicilda | ................ B62K 11/14 |
| 2020/0011087 | A1 | * | 1/2020 | Pankratius | .............. E05B 71/00 |

FOREIGN PATENT DOCUMENTS

| CA | 674190 | | 3/2010 | |
| DE | 202015006455 | U1 * | 11/2015 | ............. B62H 5/001 |
| DE | 102020112065 | A1 * | 11/2021 | |
| EP | 3591147 | A1 * | 1/2020 | ........... E05B 45/005 |

* cited by examiner

*Primary Examiner* — Daniel D Yabut

(57) ABSTRACT

A remote controller apparatus for attaching to a motorcycle and remotely operating a garage door includes a controller and a mount for attaching the controller to a handlebar of a vehicle such as a motorcycle. The mount comprises a clamp with a U-bolt that acts with a fastening bar to clamp to the handlebar. The U-bolt also acts as a shackle by inserting into the controller. A locking bar engages the U-bolt to secure the controller to the mount which is releasable by a release. Also included in the controller is a transmitter for remotely operating a door operator such as a garage door and an input for manually activating the transmitter.

14 Claims, 6 Drawing Sheets

REMOTE CONTROLLER APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to remote controllers and more particularly pertains to a new remote controller for attaching to a motorcycle and remotely operating a garage door.

(2) Description of Related Art Including Information Disclosed Under 37 CFR 1.97 and 1.98

U.S. Pat. No. 6,937,149 discloses a remote controller which releasably attaches to a motorcycle handlebar by use of threaded fasteners extending through two opposing parts across the handlebar. The prior art also includes remote controller devices which are integrated into a motorcycle. However, it may be desirable for a controller portion of a remote controller to be releasably coupled to a mount portion of the remote controller so the mount portion may remain attached to the handlebar of the motorcycle while the controller portion is in another location. For example, if the motorcycle is parked outside of the garage door which the device operates, it is desirable to remove the controller portion from the motorcycle to prevent intruders from using the device. The prior art does not disclose such a device.

BRIEF SUMMARY OF THE INVENTION

An embodiment of the disclosure meets the needs presented above by generally comprising a mount comprising a U-bolt and a fastening bar. The U-bolt comprises a pair of legs and a central portion extending between the pair of legs. The fastening bar has a pair of holes, each of which receives a respective one of the pair of legs of the U-bolt. The fastening bar also has a saddle surface facing the central portion of the U-bolt. The mount is configured for clamping a handlebar of a vehicle between the central portion of the U-bolt and the saddle surface of the fastening bar.

A controller for controlling a door operator, such as a garage door opener or gate opener, is coupled to the mount. The controller comprises a housing, a locking bar, a release, a control circuit, a transmitter, and an input. The housing is hollow and has an outer wall. The housing also has an aperture extending through the outer wall which receives a free end of one leg of the pair of legs of the U-bolt. The locking bar is coupled to and positioned within the housing. The locking bar is biased to engage the one leg. The release is coupled to and positioned in the housing for disengaging the locking bar from the U-bolt. The control circuit is coupled to and positioned in the housing. The transmitter is electrically coupled to the control circuit for transmitting a signal to the door operator. The input is electrically coupled to the control circuit and is actuatable to activate the transmitter.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
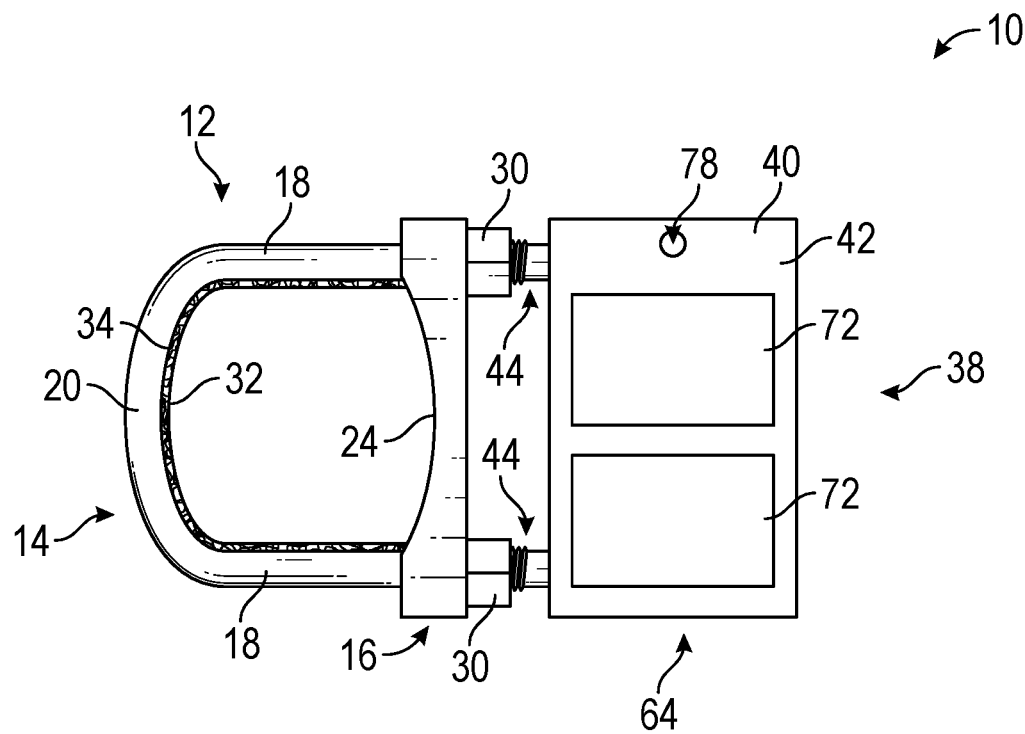
FIG. 1 is a front view of a remote controller apparatus according to an embodiment of the disclosure.
Figure 2:
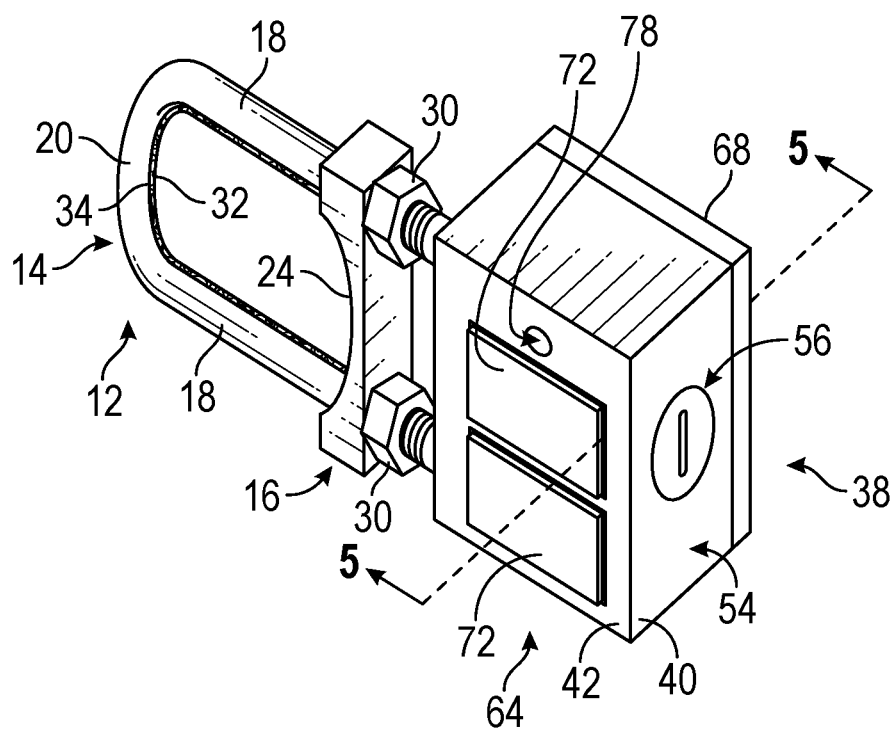
FIG. 2 is a top front side perspective view of an embodiment of the disclosure.
Figure 3:
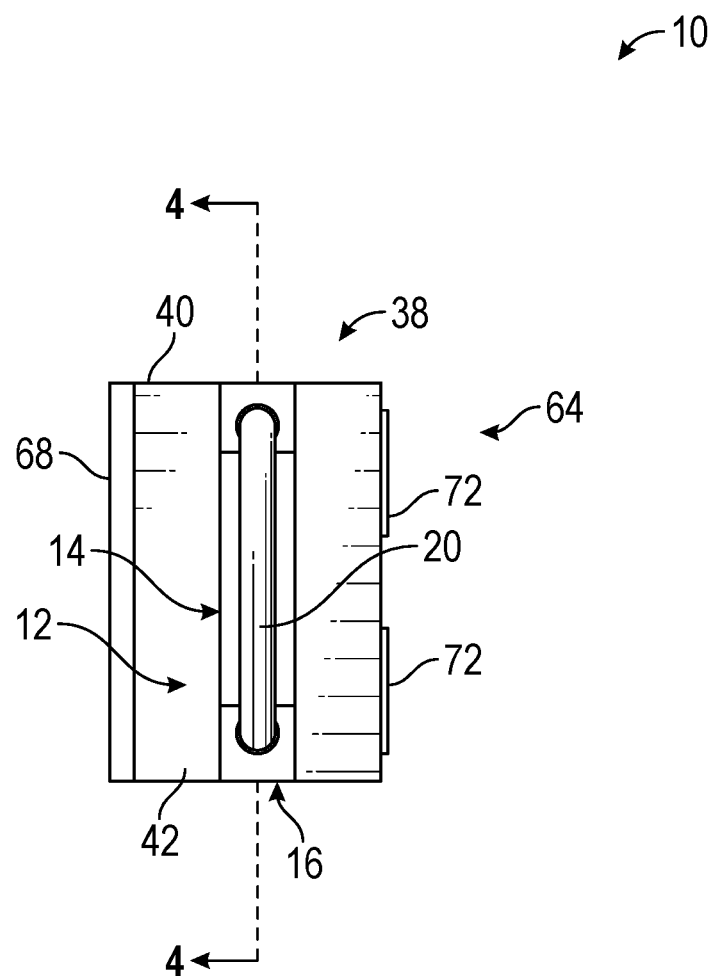
FIG. 3 is a side view of an embodiment of the disclosure.
Figure 4A:
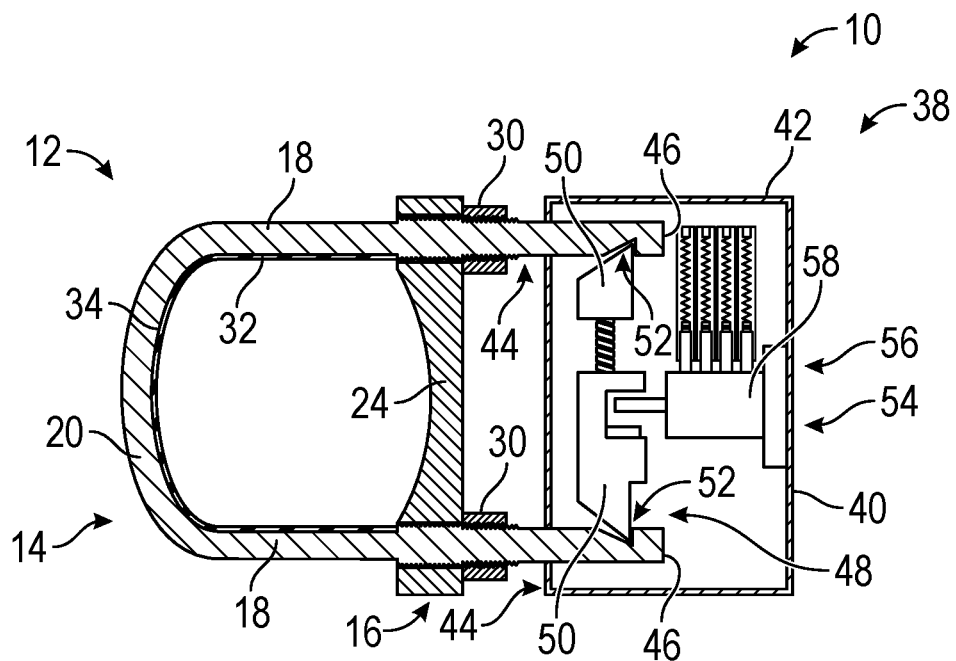
FIG. 4A is a cross-sectional view of an embodiment of the disclosure taken from Arrows 4-4 in FIG. 3.
Figure 4B:
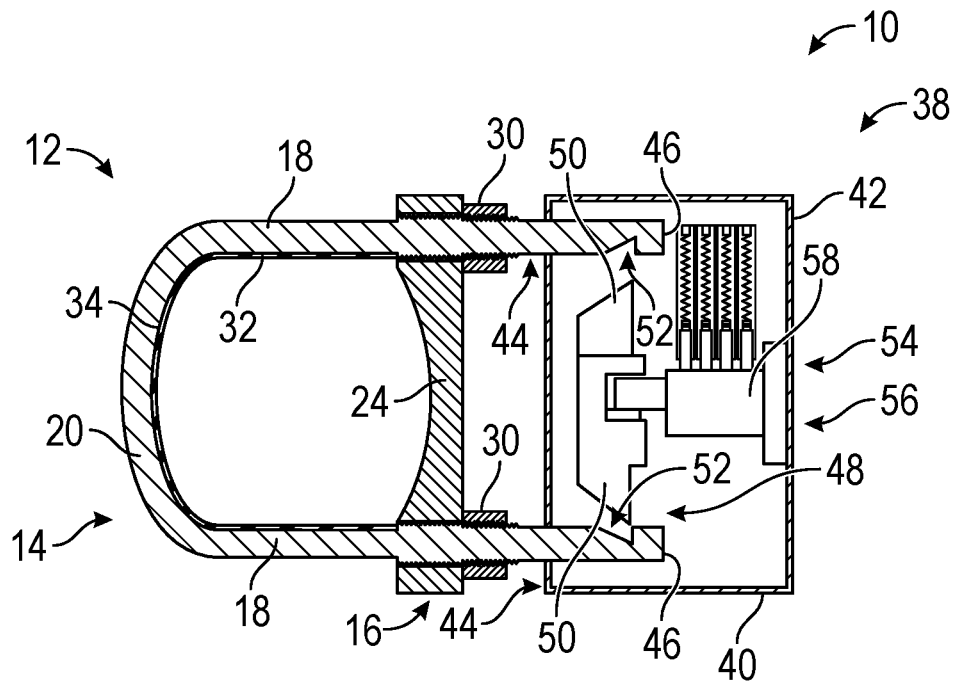
FIG. 4B is a cross-sectional view of an embodiment of the disclosure taken from Arrows 4-4 in FIG. 3.
Figure 5:
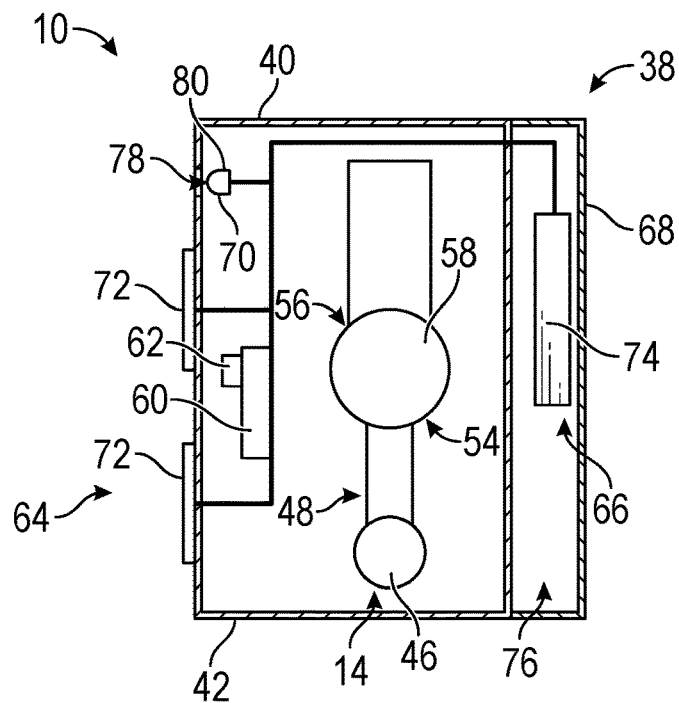
FIG. 5 is a cross-sectional view of an embodiment of the disclosure taken from Arrows 5-5 in FIG. 2.
Figure 6:
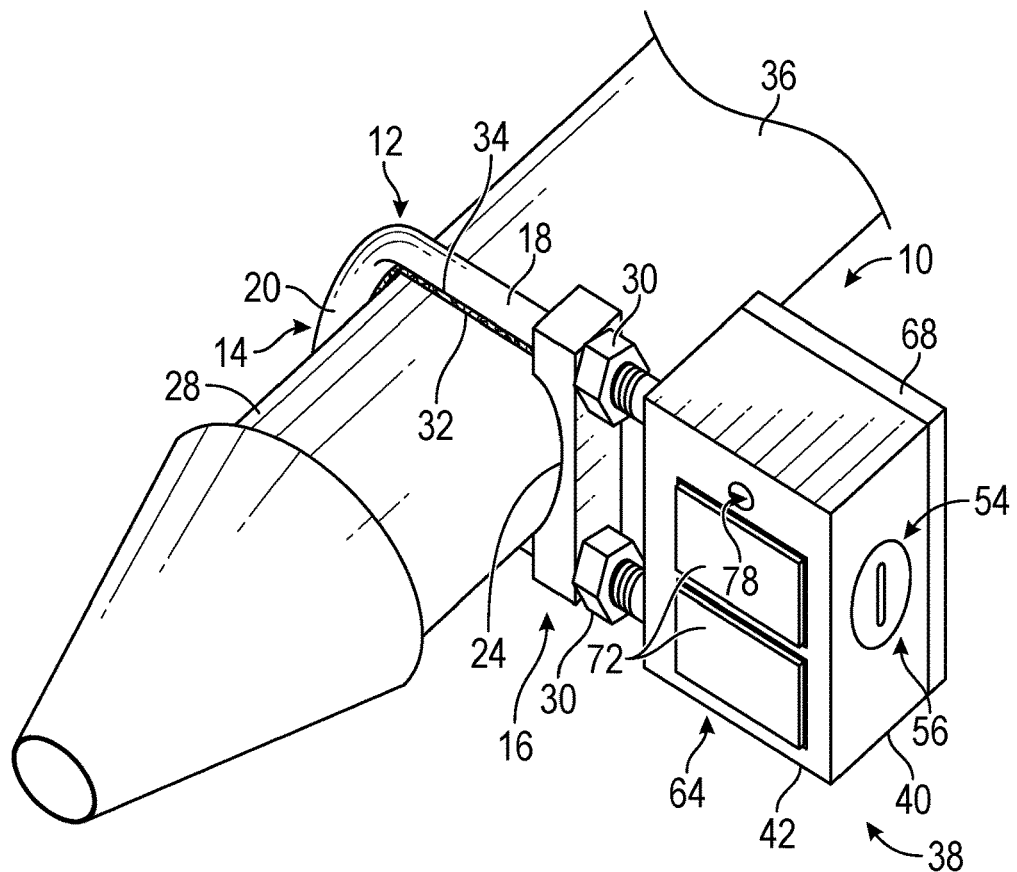
FIG. 6 is an in-use view of an embodiment of the disclosure.
Figure 7:
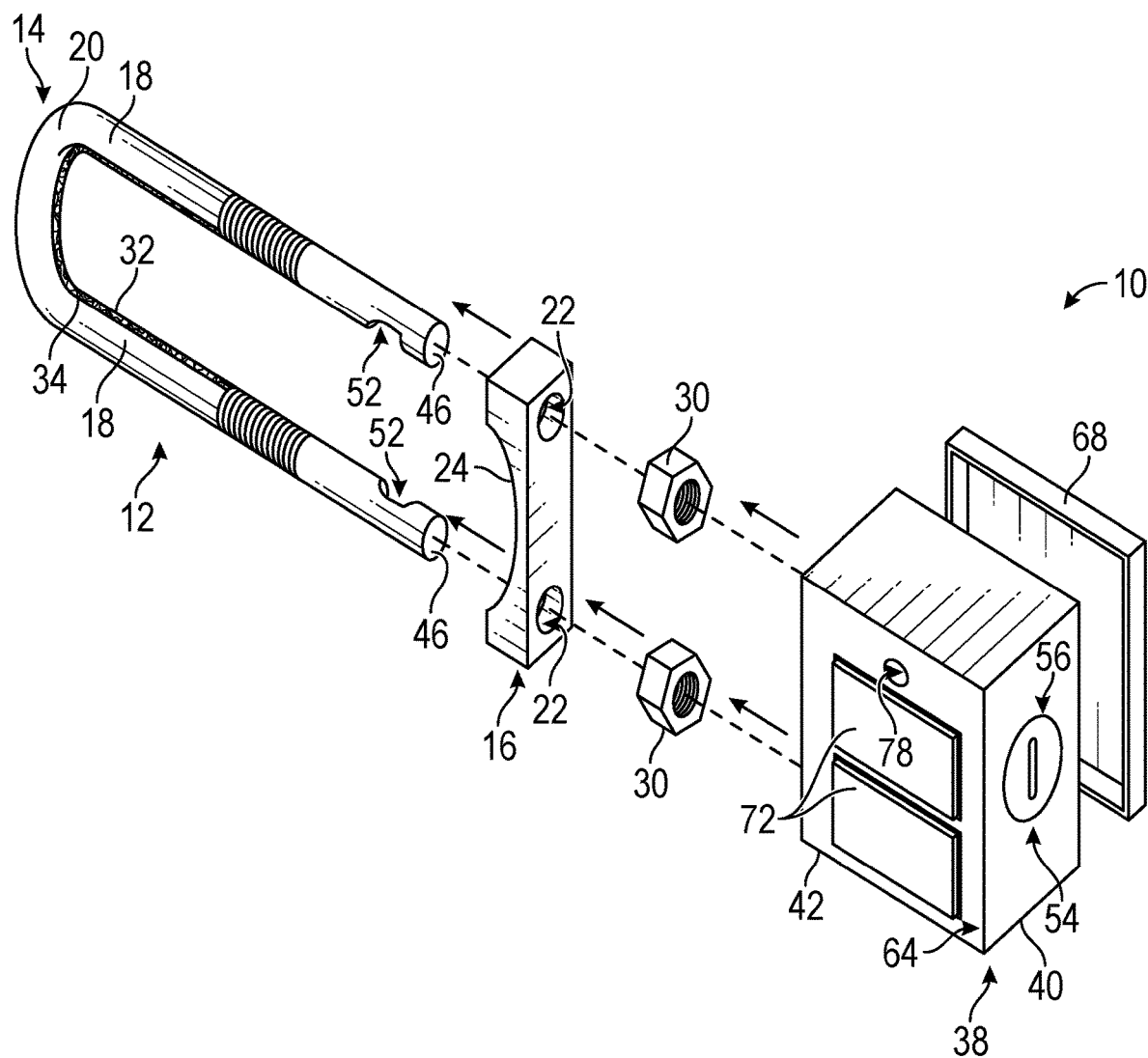
FIG. 7 is an exploded view of an embodiment of the disclosure.
Figure 8:
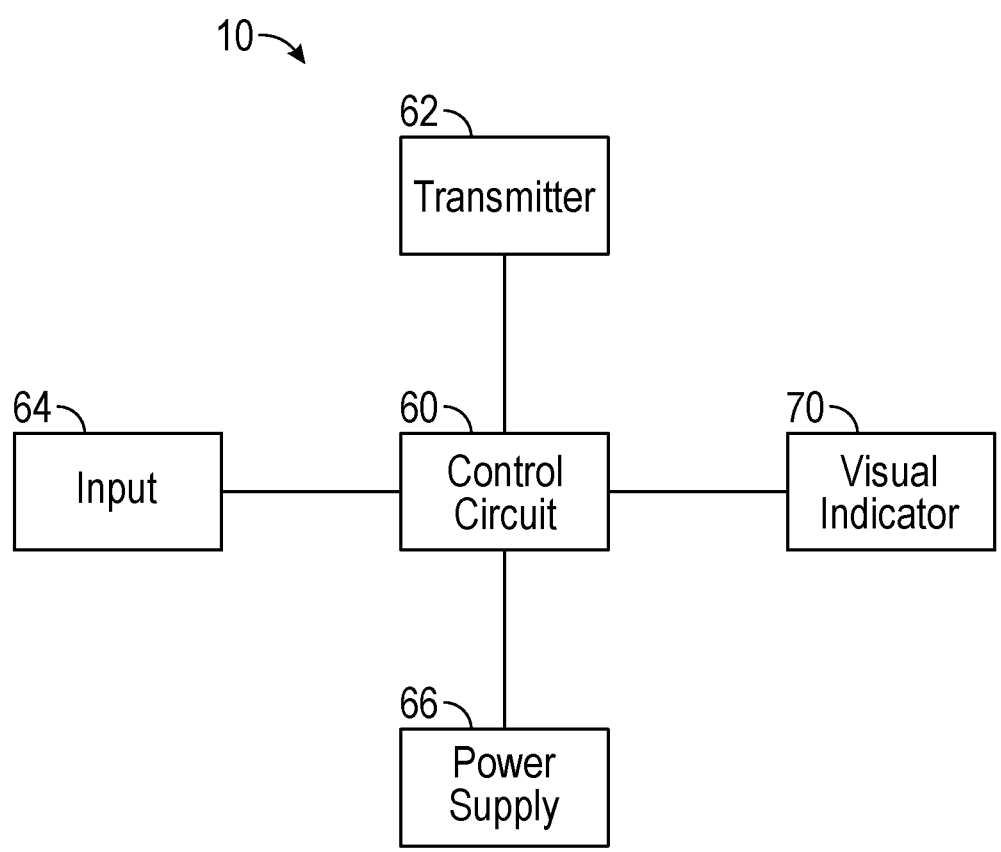
FIG. 8 is a block diagram of an embodiment of the disclosure.

With reference now to the drawings, and in particular to FIGS. 1 through 8 thereof, a new remote controller embodying the principles and concepts of an embodiment of the disclosure and generally designated by the reference numeral 10 will be described.

As best illustrated in FIGS. 1 through 8, the remote controller apparatus 10 generally comprises a mount 12 including a U-bolt 14 and a fastening bar 16. The U-bolt 14 comprises a pair of legs 18 and a central portion 20 extending between the pair of legs 18. The fastening bar 16 has a pair of holes 22, each of which receives a respective one of the pair of legs 18 of the U-bolt 14. The fastening bar 16 has a saddle surface 24 facing the central portion 20 of the U-bolt 14. The saddle surface 24 is concavely arcuate and extends between the pair of holes 22. The fastening bar 16 is movable toward the central portion 20 of the U-bolt 14 to securely clamp to a handlebar 28 of a vehicle, the handlebar 28 being positioned between the central portion 20 of the U-bolt 14 and the saddle surface 24 of the fastening bar 16. The vehicle may be a motorcycle, bicycle, or the like.

Each one of a pair of nuts 30 is threadedly coupled to a respective one of the pair of legs 18 of the U-bolt 14 with the fastening bar 16 being positioned between the central portion 20 of the U-bolt 14 and the pair of nuts 30. The nuts 30 clamp the handlebar 28 between the U-bolt 14 and the fastening bar 16. However, threaded rods, latches, or the like may be used to clamp the handlebar 28 between the U-bolt 14 and the fastening bar 16. A lining 32 is coupled to an inner surface 34 of the U-bolt 14. The lining 32 is resiliently compressible and nonabrasive so that the lining 32 may engage the handlebar 28 without marring an outer surface 36 of the handlebar 28. For example, the lining 32 may comprise rubber, polymer foam, or the like.

A controller 38 for controlling a door operator is coupled to the mount 12. The door operator may be a garage door opener, gate opener, or similar device for opening and closing a barrier along a path or passageway. The controller 38 includes a housing 40, which is hollow and has an outer wall 42. The housing 40 has a pair of apertures 44, each of which extends through said outer wall 42 and receives a free end 46 of an associated leg 18 of the pair of legs 18 of the U-bolt 14. The controller 38 also includes a locking bar 48 which is coupled to and positioned within the housing 40. The locking bar 48 is biased to engage both legs 18 of the pair of legs 18 of the U-bolt 14. The locking bar 48 comprising a pair of locking arms 50. Each locking arm 50 of the pair of locking arms 50 is biased away from another locking arm 50 of the pair of locking arms 50 toward a respective leg 18 of the pair of legs 18 of the U-bolt 14. Each leg 18 of the pair of legs 18 of the U-bolt 14 also has a notch 52 for receiving a respective locking arm 50 of the pair of locking arms 50. The controller 38 further includes a release 54 which is coupled to and positioned in the housing 40 for disengaging the locking bar 48 from the pair of legs 18 of the U-bolt 14. The release 54 comprises a pin tumbler lock 56 that has a tumbler 58. The tumbler 58 is rotatable to engage each locking arm 50 of the pair of locking arms 50 to urge the locking arms 50 toward each other and away from the respective leg 18 of the U-bolt 14.

The controller 38 also includes a control circuit 60, a transmitter 62, an input 64, a power supply 66, a cover 68, and a visual indicator 70. The control circuit 60 is coupled to and positioned in the housing 40, and the transmitter 62 is electrically coupled to the control circuit 60 for transmitting a signal to the door operator. The input 64 is electrically coupled to the control circuit 60 is actuatable to activate the transmitter 62. The input 64 comprises a pair of buttons 72 which is positioned on the outer wall 42 of the housing 40. The control circuit 60 is programmable such that each button 72 of the pair of buttons 72 causes the transmitter 62 to send different signals for operating different door operators when actuated. The input 64 may include switches, knobs, a touchscreen, or the like for activating the transmitter 62.

The power supply 66 is electrically coupled to the control circuit 60 and comprises a battery 74. The cover 68 is removably attached to the outer wall 42 of the housing 40. The cover 68 and the outer wall 42 define a compartment 76, and the battery 74 is positioned in the compartment 76. A visual indicator 70 for indicating a low power level of the power supply 66 is electrically coupled to the control circuit 60 and is viewable from without the housing 40 through a port 78 in the outer wall 42. The visual indicator 70 may, for example, be a light emitter 80.

In use, the mount 12 is attached to the handlebar 28 of the vehicle by clamping the handlebar 28 between the U-bolt 14 and the fastening bar 16. The controller 38 is attached to the mount 12 by inserting the free end 46s of the U-bolt 14 through the apertures 44 of the housing 40 such that the locking bar 48 engages the legs 18 of the U-bolt 14. The input 64 is then actuated as desired to operate the door operator. To remove the controller 38 from the mount 12, the release 54 is actuated by inserting a key corresponding to the release 54 such that the tumbler 58 is rotatable and turning the key to rotate the tumbler 58. The tumbler 58 engages the locking bar 48 to disengage it from the U-bolt 14, and the controller 38 is removed from the mount 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A remote controller apparatus for a door operator, the remote controller apparatus comprising:
   a mount comprising:
      a U-bolt comprising a pair of legs and a central portion extending between said pair of legs;
      a fastening bar having a pair of holes, each hole of said pair of holes receiving a respective one of said pair of legs of said U-bolt, said fastening bar having a saddle surface facing said central portion of said U-bolt; and
      said mount being configured for clamping a handlebar of a vehicle between said central portion of said U-bolt and said saddle surface of said fastening bar; and
   a controller for controlling the door operator being coupled to said mount, said controller comprising:
      a housing being hollow and having an outer wall, said housing having an aperture, said aperture receiving a free end of one leg of said pair of legs of said U-bolt;
      a locking bar being coupled to and positioned within said housing, said locking bar being biased to engage said one leg;

a release being coupled to and positioned in said housing for disengaging said locking bar from said U-bolt;
a control circuit being coupled to and positioned in said housing;
a transmitter being electrically coupled to said control circuit for transmitting a signal to the door operator; and
an input being electrically coupled to said control circuit being actuatable to activate said transmitter.

2. The apparatus of claim 1, wherein said saddle surface is concavely arcuate, said saddle surface extending between said pair of holes.

3. The apparatus of claim 1, wherein said mount further comprises a pair of nuts, each nut of said pair of nuts being threadedly coupled to a respective one of said pair of legs of said U-bolt, said fastening bar being positioned between said central portion of said U-bolt and said pair of nuts.

4. The apparatus of claim 1, wherein said mount further comprises a lining being coupled to an inner surface of said U-bolt, said lining being resiliently compressible and nonabrasive, said lining being configured for engaging the handlebar without marring an outer surface of the handlebar.

5. The apparatus of claim 1, wherein said aperture is one of a pair of apertures, each aperture of said pair of apertures extending through said outer wall, each aperture of said pair of apertures receiving a free end of an associated leg of said pair of legs of said U-bolt, said locking bar being biased to engage both legs of said pair of legs of said U-bolt.

6. The apparatus of claim 5, wherein said locking bar comprises a pair of locking arms, each locking arm of said pair of locking arms being biased away from another locking arm of said pair of locking arms toward a respective leg of said pair of legs of said U-bolt.

7. The apparatus of claim 6, wherein each leg of said pair of legs of said U-bolt has a notch for receiving a respective locking arm of said pair of locking arms.

8. The apparatus of claim 6, wherein said release comprises a pin tumbler lock having a tumbler which is rotatable to engage each locking arm of said pair of locking arms to urge said locking arms toward each other and away from said respective leg of said U-bolt.

9. The apparatus of claim 1, wherein said input comprises a pair of buttons being positioned on said outer wall of said housing.

10. The apparatus of claim 1, wherein said controller further comprises a power supply being electrically coupled to said control circuit.

11. The apparatus of claim 10, wherein said power supply comprises a battery.

12. The apparatus of claim 11, wherein said controller further comprises a cover being removably attached to said outer wall of said housing, said cover and said outer wall defining a compartment, said battery being positioned in said compartment.

13. The apparatus of claim 10, wherein said controller further comprises a visual indicator for indicating a low power level of said power supply being electrically coupled to said control circuit and being viewable from without said housing, said housing having a port in said outer wall, said visual indicator being viewable through said port.

14. A remote controller apparatus for a door operator, the remote controller apparatus comprising:
a mount comprising:
a U-bolt comprising a pair of legs and a central portion extending between said pair of legs;
a fastening bar having a pair of holes, each hole of said pair of holes receiving a respective one of said pair of legs of said U-bolt, said fastening bar having a saddle surface facing said central portion of said U-bolt, said saddle surface being concavely arcuate, said saddle surface extending between said pair of holes;
said mount being configured for clamping a handlebar of a vehicle between said central portion of said U-bolt and said saddle surface of said fastening bar;
a pair of nuts, each nut of said pair of nuts being threadedly coupled to a respective one of said pair of legs of said U-bolt, said fastening bar being positioned between said central portion of said U-bolt and said pair of nuts; and
a lining being coupled to an inner surface of said U-bolt, said lining being resiliently compressible and nonabrasive, said lining being configured for engaging the handlebar without marring an outer surface of the handlebar; and
a controller for controlling the door operator being coupled to said mount, said controller comprising:
a housing being hollow and having an outer wall, said housing having a pair of apertures, each aperture of said pair of apertures extending through said outer wall, each aperture of said pair of apertures receiving a free end of an associated leg of said pair of legs of said U-bolt;
a locking bar being coupled to and positioned within said housing, said locking bar being biased to engage both legs of said pair of legs of said U-bolt, said locking bar comprising a pair of locking arms, each locking arm of said pair of locking arms being biased away from another locking arm of said pair of locking arms toward a respective leg of said pair of legs of said U-bolt, each leg of said pair of legs of said U-bolt having a notch for receiving a respective locking arm of said pair of locking arms;
a release being coupled to and positioned in said housing for disengaging said locking bar from said pair of legs of said U-bolt, said release comprising a pin tumbler lock having a tumbler which is rotatable to engage each locking arm of said pair of locking arms to urge said locking arms toward each other and away from said respective leg of said U-bolt;
a control circuit being coupled to and positioned in said housing;
a transmitter being electrically coupled to said control circuit for transmitting a signal to the door operator;
an input being electrically coupled to said control circuit being actuatable to activate said transmitter, said input comprising a pair of buttons being positioned on said outer wall of said housing;
a power supply being electrically coupled to said control circuit, said power supply comprising a battery;
a cover being removably attached to said outer wall of said housing, said cover and said outer wall defining a compartment, said battery being positioned in said compartment;
a visual indicator for indicating a low power level of said power supply being electrically coupled to said control circuit and being viewable from without said housing, said housing having a port in said outer wall, said visual indicator being viewable through said port.

* * * * *